United States Patent
Vu et al.

(10) Patent No.: US 10,280,761 B2
(45) Date of Patent: May 7, 2019

(54) THREE DIMENSIONAL AIRFOIL MICRO-CORE COOLING CHAMBER

(71) Applicant: UNITED TECHNOLOGIES CORPORATION, Hartford, CT (US)

(72) Inventors: Ky H. Vu, East Hartford, CT (US); Brandon W. Spangler, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 838 days.

(21) Appl. No.: 14/872,272

(22) Filed: Oct. 1, 2015

(65) Prior Publication Data
US 2016/0194964 A1    Jul. 7, 2016

Related U.S. Application Data

(60) Provisional application No. 62/069,914, filed on Oct. 29, 2014.

(51) Int. Cl.
*F01D 5/18* (2006.01)
*F23R 3/04* (2006.01)

(52) U.S. Cl.
CPC .............. *F01D 5/186* (2013.01); *F01D 5/187* (2013.01); *F23R 3/04* (2013.01); *F05D 2260/202* (2013.01); *F05D 2260/2214* (2013.01); *Y02T 50/676* (2013.01)

(58) Field of Classification Search
CPC ....................................................... F01D 5/186
See application file for complete search history.

(56) References Cited

U.S. PATENT DOCUMENTS

| | | | | |
|---|---|---|---|---|
| 6,280,140 B1 * | 8/2001 | Soechting | ............... | F01D 5/184 416/97 R |
| 7,137,776 B2 * | 11/2006 | Draper | .................... | F23R 3/005 415/115 |
| 7,527,474 B1 * | 5/2009 | Liang | ...................... | F01D 5/186 416/1 |
| 7,537,431 B1 * | 5/2009 | Liang | ...................... | F01D 5/187 415/115 |
| 8,066,485 B1 * | 11/2011 | Liang | ...................... | F01D 5/186 415/115 |
| 8,109,725 B2 * | 2/2012 | Abdel-Messeh | ........ | F01D 5/186 416/96 R |
| 8,303,252 B2 * | 11/2012 | Piggush | .................. | F01D 5/187 415/115 |

(Continued)

FOREIGN PATENT DOCUMENTS

| | | |
|---|---|---|
| EP | 1101899 A1 | 5/2001 |
| EP | 1445424 A2 | 8/2004 |
| EP | 1884621 A2 | 2/2008 |

OTHER PUBLICATIONS

European Search Report for European Application No. 15191982.6 dated Mar. 7, 2016.

*Primary Examiner* — Woody A Lee, Jr.
(74) *Attorney, Agent, or Firm* — Carlson, Gaskey & Olds, P.C.

(57) ABSTRACT

A component for use in a gas turbine engine comprises a body and a micro-core cooling circuit embedded within the body. The micro-core circuit has a variation in either the thickness or contoured surface, away from a generally planar shape to a non-planar shape.

15 Claims, 3 Drawing Sheets

(56) References Cited

U.S. PATENT DOCUMENTS

| | | | | |
|---|---|---|---|---|
| 8,449,246 B1* | 5/2013 | Liang | ............... | F01D 9/04 |
| | | | | 415/115 |
| 8,572,844 B2* | 11/2013 | Piggush | ............ | B22C 9/04 |
| | | | | 29/889.7 |
| 9,981,308 B2* | 5/2018 | Digard Brou De Cuissart | ......... | |
| | | | | B22C 9/10 |
| 10,030,523 B2* | 7/2018 | Quach | ............ | F01D 5/187 |
| 2004/0151587 A1* | 8/2004 | Cunha | ............. | F01D 5/18 |
| | | | | 416/97 R |
| 2004/0197191 A1* | 10/2004 | Cunha | ............ | F01D 5/186 |
| | | | | 416/97 R |
| 2005/0265838 A1* | 12/2005 | Liang | ............. | F01D 5/182 |
| | | | | 416/97 R |
| 2006/0263221 A1* | 11/2006 | Cunha | ............. | F01D 9/02 |
| | | | | 416/193 A |
| 2007/0116568 A1* | 5/2007 | Cunha | ............ | F01D 5/186 |
| | | | | 416/97 R |
| 2007/0248462 A1* | 10/2007 | Lutjen | ............ | F01D 9/06 |
| | | | | 416/95 |
| 2008/0019839 A1* | 1/2008 | Cunha | ............ | F01D 5/187 |
| | | | | 416/96 R |
| 2009/0097977 A1* | 4/2009 | Cunha | ............ | F01D 5/187 |
| | | | | 416/95 |
| 2009/0297361 A1* | 12/2009 | Dahmer | ............ | F01D 5/187 |
| | | | | 416/97 R |
| 2013/0108416 A1* | 5/2013 | Piggush | ............ | F01D 5/187 |
| | | | | 415/173.1 |
| 2015/0122445 A1* | 5/2015 | Truelle | ............ | F01D 5/20 |
| | | | | 164/15 |

* cited by examiner

THREE DIMENSIONAL AIRFOIL MICRO-CORE COOLING CHAMBER

CROSS-REFERENCE TO RELATED APPLICATION

This application claims priority to U.S. Provisional Patent Application No. 62/069,914, filed Oct. 29, 2014.

STATEMENT REGARDING FEDERALLY SPONSORED RESEARCH OR DEVELOPMENT

This invention was made with government support under Contract No. FA8650-09-D-2923 0021, awarded by the United States Air Force. The Government has certain rights in this invention.

BACKGROUND OF THE INVENTION

This application relates to a three dimensional micro-core cooling channel.

Gas turbine engines are known and typically include a compressor delivering air into a combustor. The air is mixed with fuel and ignited, and products of this combustion pass downstream over turbine rotors driving them to rotate. The turbine rotors carry rows of blades and vanes intermediate the rows of blades. In addition, there are a number of seals which ensure close clearances between the rotating blades and outer housings.

The products of combustion are extremely hot and, thus, the components mentioned above in the path of the products of combustion are subject to high temperature. Cooling air is typically provided to these components. The components have historically been formed with hollowed spaces and channels which receive cooling air.

More recently, so-called micro-channel or micro-core cooling circuits have been designed. These cooling circuits are relatively thin and provide very efficient cooling. As an example, a micro-core cooling channel could be defined as having a thickness of less than 0.040 inch (0.102 centimeter).

The micro-core cooling channels that have been utilized have, typically, been flat and rectangular.

SUMMARY OF THE INVENTION

In a featured embodiment, a component for use in a gas turbine engine comprises a body and a micro-core cooling circuit embedded within the body. The micro-core circuit has a variation in either the thickness or contoured surface, away from a generally planar shape to a non-planar shape.

In another embodiment according to the previous embodiment, the micro-core circuit has a thickness, with an average thickness less than or equal to 0.040 inch (0.102 centimeter).

In another embodiment according to any of the previous embodiments, the thickness varies.

In another embodiment according to any of the previous embodiments, an inlet communicates into the micro-core circuit.

In another embodiment according to any of the previous embodiments, the inlet communicates into a thicker portion of the micro-core circuit.

In another embodiment according to any of the previous embodiments, the micro-core circuit could be defined generally as having a length and a width and the contoured surface curves in at least one of the length and the width.

In another embodiment according to any of the previous embodiments, the component has at least one platform and an airfoil, the platform and the airfoil curving, and the curve in the micro-core circuit being adjacent to the curve in the airfoil.

In another embodiment according to any of the previous embodiments, the component has an outer surface and the contoured surface of the micro-core circuit follows the outer surface.

In another embodiment according to any of the previous embodiments, the component has an outer surface and the contoured surface of the micro-core circuit has portions closer to the outer surface and other portions spaced further from the outer surface.

In another embodiment according to any of the previous embodiments, the component is one of a vane, a blade, a blade outer air seal, or a combustor element for use in a gas turbine engine.

In another featured embodiment, a gas turbine engine comprises a turbine section and a combustor and at least one of the turbine section and the combustor including a component, a body and a micro-core cooling circuit imbedded within the body. The micro-core circuit has a variation in either the thickness or contoured surface, away from a generally planar shape to a non-planar shape.

In another embodiment according to the previous embodiment, the micro-core circuit has a thickness, with an average of the thickness being less than or equal to 0.040 inch (0.102 centimeter).

In another embodiment according to any of the previous embodiments, the thickness varies.

In another embodiment according to any of the previous embodiments, an inlet communicates into the micro-core circuit.

In another embodiment according to any of the previous embodiments, the inlet communicates into a thicker portion of the micro-core circuit.

In another embodiment according to any of the previous embodiments, the micro-core circuit could be defined generally as having a length and a width. The contoured surface curves in at least one of the length and the width.

In another embodiment according to any of the previous embodiments, the component has a platform and an airfoil extending from the platform and the airfoil curving, and the curve in the micro-core circuit is adjacent to the curve in the airfoil.

In another embodiment according to any of the previous embodiments, the component has an outer surface and the contoured surface of the micro-core circuit follows the outer surface.

In another embodiment according to any of the previous embodiments, the component has an outer surface and the contoured surface of the micro-core circuit has portions closer to the outer surface and other portions spaced further from the outer surface.

In another featured embodiment, a core for forming a micro-core cooling circuit in a gas turbine engine component comprises a body having an average thickness less than or equal to 0.040 inch (0.102 centimeter). The body has a variation in either the thickness or a contoured surface, away from a generally planar shape to a non-planar shape.

These and other features may be best understood from the following drawings and specification.

DETAILED DESCRIPTION

Figure 1:
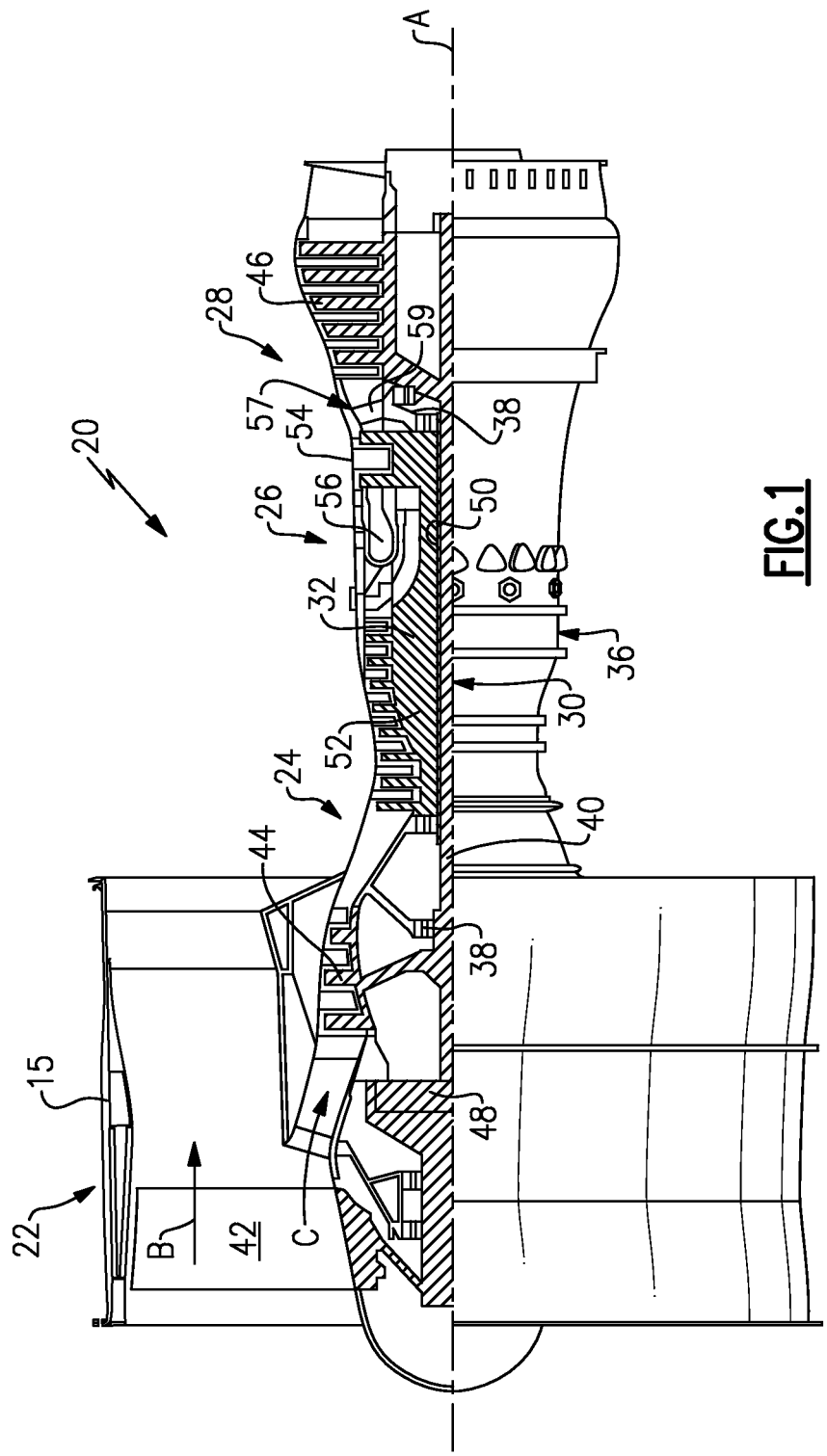
FIG. 1 is a schematic view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram} \,^\circ \text{R})/(518.7^\circ \text{R})]^{0.5}$. The "Low corrected fan tip speed" as disclosed herein according to one non-limiting embodiment is less than about 1150 ft/second (350.5 meters/second).

Figure 2:
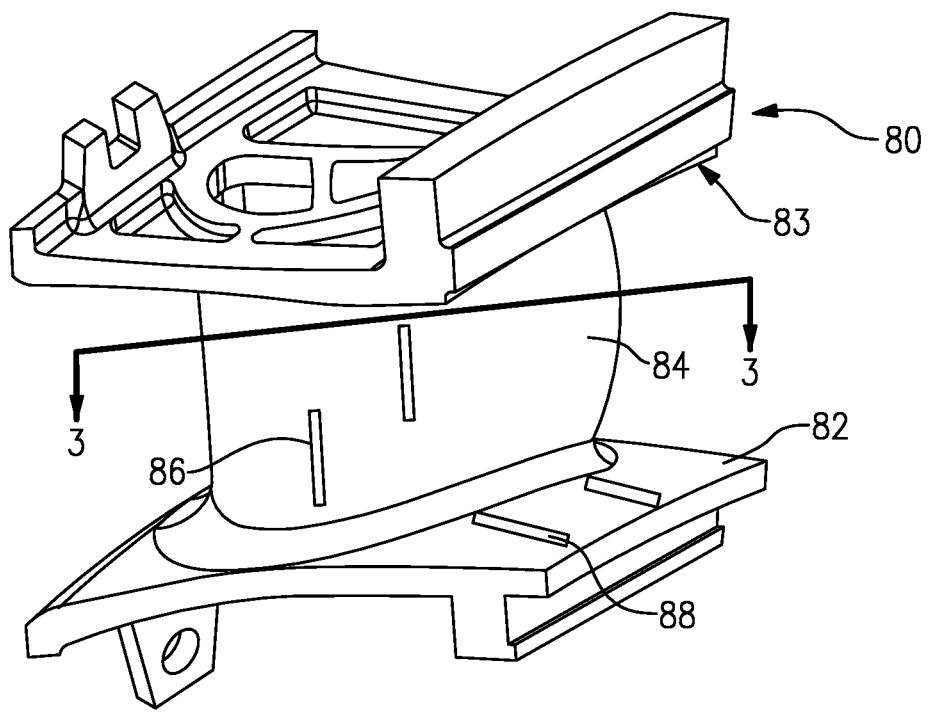
FIG. 2 shows a vane that might be utilized in the FIG. 1 engine.

FIG. 2 shows a component 80 which may be incorporated into the turbine section of the FIG. 1 engine. The component is illustrated as a static vane, however, it should be understood that the teachings of this disclosure would extend to rotating blades, blade outer air seals, combustors, or any other components which may utilize cooling circuits.

The vane component 80 has a body which incorporates an outer platform 83 and/or an inner platform 82 and an airfoil 84. Micro-core cooling circuits 86 and 88 are shown schematically in the airfoil 84 and platform 82, respectively. While the Figures locate the circuits 86 and 88 in platform 82, they could also be in platform 83, or airfoil 84.

Figure 3:
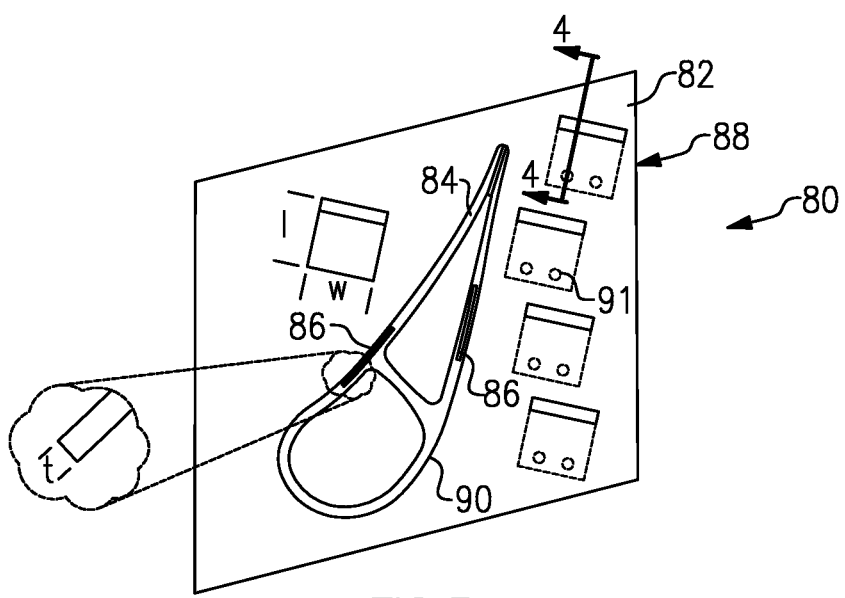
FIG. 3 is a sectional view along line 3-3 of FIG. 2.

FIG. 3 shows the potential locations for the circuits 86 and 88. As shown, one of the circuits 86 has a thickness that may be defined as t. A micro-core cooling circuit can be defined as having this thickness be less than or equal to 0.040 inch (0.102 centimeter) on average. Typically, the thickness is much smaller and may be less than 0.020 inch (0.051 centimeter) on average.

On the other hand, one of the circuits 88 is shown to have a length l and width w. These dimensions are generally much greater than the thickness t. As can be appreciated, the airfoil 84 has curving sides, such as shown at 90. This curving side may result in the generally rectangular illustrated cores 88 being somewhat inefficient at locations where the airfoil has curved away or closer to a cooling circuit. It should be understood the micro-core circuits shown are schematic.

Figure 4:
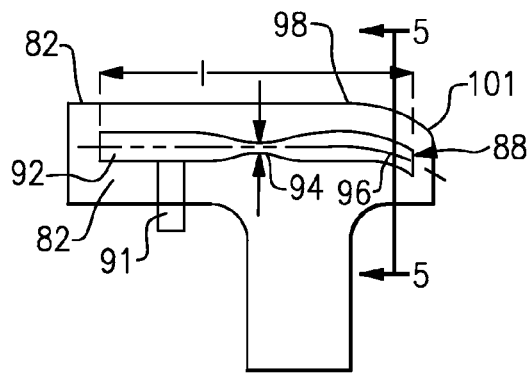
FIG. 4 shows a cross-section through a micro-core cooling circuit.

FIG. 4 shows an inventive micro-core circuit 88. The view shown in FIG. 4 is through the thickness of the micro-core circuit 88. As shown, there is a variation in the thickness along the dimension illustrated. Thus, there is a thicker portion 92 for receiving air from an inlet 91 and a necked down portion 94. Although FIG. 4 shows the necked down portion moves inwardly from both sides of the portion 92, the necking could occur on one or the other sides as well. Moreover, FIG. 4 depicts a portion 96 that curves downwardly from the necked portion 94 to follow an upper surface 98 of the inner platform 82. As mentioned, the same micro-circuit 88 can be embedded in upper platform 83. The cores can be made by ceramic or by RMC. The ceramic cores are made by the ceramic core die and would only require a different shape in the die (they are still pullable). The RMC cores are currently stamped and would just require a different stamping die shape to create the contours or variable thickness.

Figure 5:
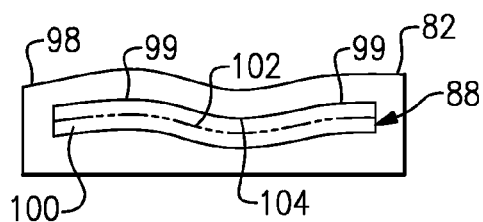
FIG. 5 is a cross-sectional view along line 5-5 of FIG. 4.

FIG. 5 shows a potential shape along the width of the micro-core circuit 88. As shown, the shape 102 curves to follow the curvature of a top surface 98 of the inner platform 82 and/or a top surface 98 of the outer platform 83 so that portions 99 and 104 are the same distance from the top surface 98, maintaining constant wall thickness. Although FIG. 5 shows a core contoured in the width direction, the core may also be contoured in the length direction, as represented by the curved portion 96 in FIG. 4, which follows a curved portion 101 on top surface 98.

By the term "follow" and by "same distance," this application simply implies that in general the curvatures may be in the same direction at approximately corresponding locations between the top surface and the micro-core circuit 88. Thus, the distances from the top surface need not be identically equal, and there may be some variation somewhere along the length. However, in general, in these embodiments, the distance between the top surface and the micro-core circuit 88 will be closer to being equal than if the curvature did not "follow" the top surface 98.

Figure 6:
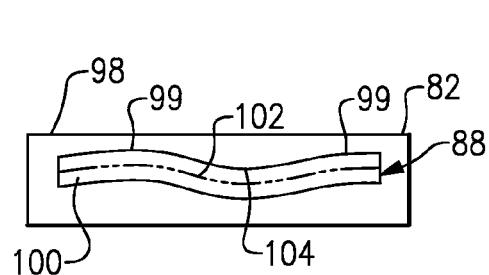
FIG. 6 shows an alternate embodiment.

FIG. 6 shows another embodiment, where the shape of the core 102 does not follow the top surface 98, resulting in portions 99 being closer to and portions 104 being farther from top surface 98.

Figure 7:
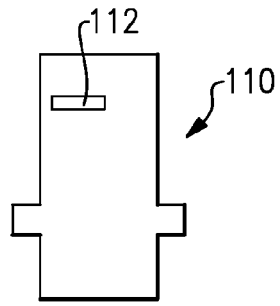
FIG. 7 shows an alternate embodiment.

FIG. 7 shows a blade 110 which incorporates a circuit 112. Circuit 112 may be structured as disclosed above.

Figure 8:
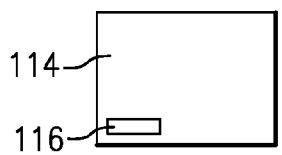
FIG. 8 shows yet another alternate embodiment.

FIG. 8 shows another potential component 114 having a circuit 116. Again, circuit 116 may be generally structured as disclosed above. Component 114 could be a blade outer air seal, or a component in a combustor section.

Figure 9A:
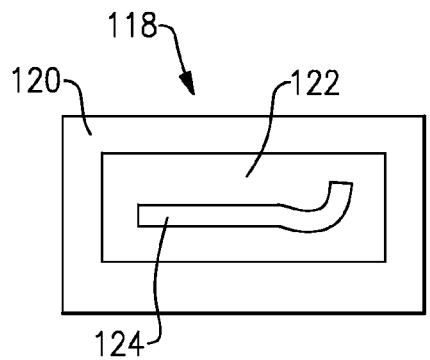
FIG. 9A shows a first method step.

FIG. 9A shows a first method step. A molding operation 110 includes a mold 120 receiving molten metal to form a component 122. Component 122 may be any of the previously disclosed components. A lost core 124 is formed and deposited within the mold 120. Lost core molding techniques are generally known. As shown, the core 124 is a micro-core cooling circuit having an average thickness less than or equal to 0.040 inch (0.102 centimeters). Further, the core 124 has a variation of either the thickness or a contoured surface, away from a generally planar shape to a non-planar shape.

Figure 9B:
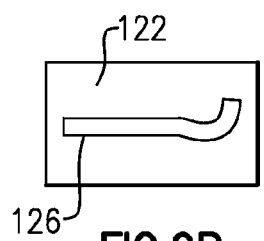
FIG. 9B shows a subsequent method step.

FIG. 9B shows a subsequent step. The material of the core 124 is leached away leaving a hollow at 126 which provides the micro-core circuit.

It should be understood that micro-core circuits made according to this disclosure can have variations to the contoured shape in any of the three dimensions. By utilizing contoured micro-core circuits, the curvature of the outer surface of the component can be accommodated for. The micro-core circuits can track or follow the contour of an airfoil or platform(s).

Generally, component 80 for use in a gas turbine engine comprises a body and a micro-core cooling circuit 86/88 embedded within the body. The micro-core circuit has a variation in either a thickness or contoured surface, away from a generally planar shape to a non-planar shape.

By changing the thickness, cooling air can be directed to those areas which are more in need.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A component for use in a gas turbine engine comprising:
   a body having opposed surfaces spaced apart in a thickness direction and a micro-core cooling circuit, with said micro-core cooling circuit having a thickness, a length and a width, and with said length and width being greater than said thickness; and
   said micro-core cooling circuit having a variation in the thickness direction away from a generally planar shape to a non-planar shape, the micro-core circuit having an inlet which communicates into a thicker portion of said micro-core cooling circuit, and said micro-core cooling circuit having a necked down portion moving inwardly from both sides of said thicker portion, with said thickness of said micro-core cooling circuit having an average thickness of less than or equal to 0.040 inch (0.102 cm).

2. The component for use in a gas turbine engine as set forth in claim 1, wherein said micro-core circuit could be defined generally as having a length and a width and wherein a contoured surface curves in at least one of said length and said width.

3. The component for use in a gas turbine engine as set forth in claim 2, wherein said component has at least one platform and an airfoil, said platform and said airfoil curving, and said curve in said micro-core circuit being adjacent to said curve in said airfoil.

4. The component for use in a gas turbine engine as set forth in claim 2, wherein said component has an outer surface and said contoured surface of said micro-core circuit follows said outer surface.

5. The component for use in a gas turbine engine as set forth in claim 2, wherein said component has an outer surface and said contoured surface of said micro-core circuit has portions closer to said outer surface and other portions spaced further from said outer surface.

6. The component for use in a gas turbine engine as set forth in claim 1, wherein said component is one of a vane, a blade, a blade outer air seal, or a combustor element for use in a gas turbine engine.

7. The component as set forth in claim 1, wherein said component has an inner platform and an outer platform with an airfoil extending radially between said inner and outer platforms, and said body being one of said inner and outer platforms, and said thickness being defined into a radial direction.

8. The component as set forth in claim 7, wherein a portion curves radially away from said necked portion to follow an outer surface of said one of said inner and outer platforms.

9. A gas turbine engine comprising:
a turbine section and a combustor and at least one of said turbine section and said combustor including a component;
said component having a body with opposed surfaces spaced apart in a thickness direction and a micro-core cooling circuit, with said micro-core cooling circuit having a thickness, a length and a width, and with said length and width being greater than said thickness; and
said micro-core cooling circuit having a variation in the thickness direction away from a generally planar shape to a non-planar shape, the micro-core circuit having an inlet which communicates into a thicker portion of said micro-core cooling circuit, and said micro-core cooling circuit having a necked down portion moving inwardly from both sides of said thicker portion, with said thickness of said micro-core cooling circuit having an average thickness of less than or equal to 0.040 inch (0.102 cm).

10. The gas turbine engine as set forth in claim 9, wherein said micro-core circuit could be defined generally as having a length and a width and wherein a contoured surface curves in at least one of said length and said width.

11. The gas turbine engine as set forth in claim 10, wherein said component has a platform and an airfoil extending from said platform and said airfoil curving, and said curve in said micro-core circuit being adjacent to said curve in said airfoil.

12. The gas turbine engine as set forth in claim 10, wherein said component has an outer surface and said contoured surface of said micro-core circuit follows said outer surface.

13. The gas turbine engine as set forth in claim 10, wherein said component has an outer surface and said contoured surface of said micro-core circuit has portions closer to said outer surface and other portions spaced further from said outer surface.

14. The gas turbine engine as set forth in claim 9, wherein said component has an inner platform and an outer platform with an airfoil extending radially between said inner and outer platforms, and said body being one of said inner and outer platforms, and said thickness being defined into a radial direction.

15. The gas turbine engine as set forth in claim 9, wherein a portion curves radially away from said necked portion to follow an outer surface of said one of said inner and outer platforms.

* * * * *